United States Patent [19]

Oye et al.

[11] Patent Number: 4,791,660
[45] Date of Patent: Dec. 13, 1988

[54] VARIABLE DATA COMPRESSION ANNOUNCEMENT CIRCUIT

[75] Inventors: Kevin J. Oye, Red Bank, N.J.; Enzo Paterno, Staten Island, N.Y.; Thomas L. Smith, Lincroft, N.J.

[73] Assignees: American Telephone and Telegraph Company, New York, N.Y.; AT&T Information Systems Inc., Morristown, N.J.

[21] Appl. No.: 901,003

[22] Filed: Aug. 27, 1986

[51] Int. Cl.[4] .......................... G10L 3/02; H04J 3/02; H04M 3/50

[52] U.S. Cl. ...................................... 379/88; 370/61; 381/30

[58] Field of Search ...................... 379/88, 89, 84, 73, 379/71; 381/30, 31, 29, 34, 35; 370/60, 61

[56] References Cited

U.S. PATENT DOCUMENTS

| | | | |
|---|---|---|---|
| 4,356,351 | 10/1982 | Shefler et al. | 379/88 |
| 4,389,720 | 6/1983 | Baxter et al. | 370/62 |
| 4,438,296 | 3/1984 | Smith | 379/69 |
| 4,446,336 | 5/1984 | Bethel et al. | 379/76 |
| 4,535,448 | 8/1985 | Baxter et al. | 370/85 |
| 4,549,047 | 10/1985 | Brian et al. | 379/88 |
| 4,587,651 | 5/1986 | Nelson et al. | 370/88 |
| 4,625,081 | 11/1986 | Lotito et al. | 379/88 |
| 4,640,992 | 2/1987 | Rose | 379/89 |

FOREIGN PATENT DOCUMENTS 137354 8/1983 Japan ..................................... 379/84

OTHER PUBLICATIONS

"An Embedded-Code Multirate Speech Transform Coder", M. Berouti et al., Proc. of IEEE International Conf. on Acoustics, Speech and Signal Processing, Denver, CO (Apr. 9-11, 1980), pp. 356-359.

Primary Examiner—Thomas W. Brown
Attorney, Agent, or Firm—David H. Tannenbaum; David R. Padnes

[57] ABSTRACT

There is disclosed a call announcement circuit integrated into the switching network of a PBX switching system such that the announcement board resides in one of the port slots and has direct access to the internal system buses. The circuit can handle many separate announcements each stored at a selectable compression ratio. Each such announcement can be recorded or played in any of the time slots under processor control. This configuration allows tradeoffs between storage capacity and compression ratio (i.e., speech clarity) and also allows messages to be played on any line or to any station via the communication bus and the selected time slot.

20 Claims, 9 Drawing Sheets

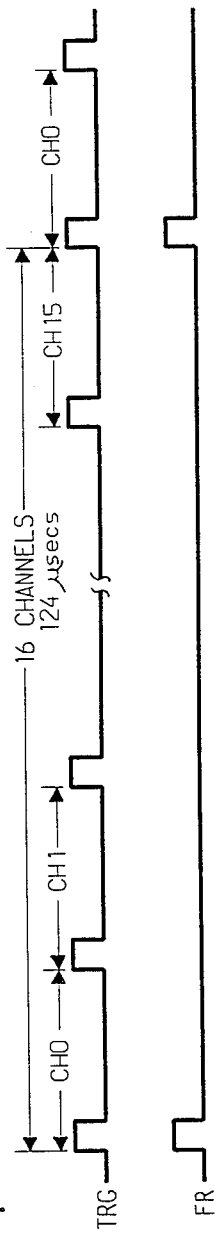
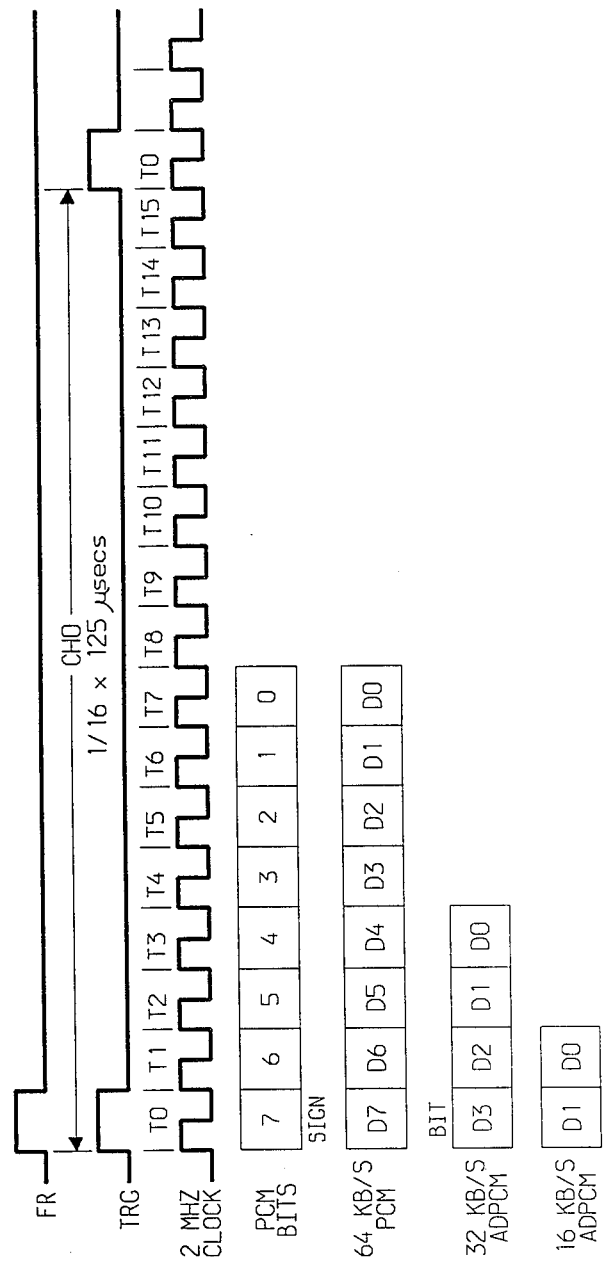
FIG. 4
FIG. 5

FIG. 10

| COMPRESSION | BYTE ORDERING BOX | |
|---|---|---|
| | INPUT | OUTPUT |
| 64 KB/S (NO COMPRESSION) | B7 B6 B5 B4 B3 B2 B1 B0 | B7 B6 B5 B4 B3 B2 B1 B0 |
| 32 KB/S (2:1 COMPRESSION) | B7 B6 B5 B4 B3 B2 B1 B0 | B3 B2 B1 B0 X X X X<br>B7 B6 B5 B4 X X X X |
| 16 KB/S (4:1 COMPRESSION) | B7 B6 B5 B4 B3 B2 B1 B0 | B1 B0 X X X X X X<br>B3 B2 X X X X X X<br>B5 B4 X X X X X X<br>B7 B6 X X X X X X |

VARIABLE DATA COMPRESSION ANNOUNCEMENT CIRCUIT

BACKGROUND OF THE INVENTION

This invention relates to announcement systems and, more particularly, to such systems which provide flexible system control.

In the past, recorded announcements have been provided via stand-alone equipment containing stored voice messages that were connected to the switch via an analog line or trunk. The messages have been stored in analog form on magnetic media (such as a tape or magnetic drum) or, in one recent case, the analog message signal from the switch has been digitally encoded and stored in the announcement equipment. In all cases, control of the announcement equipment has been limited by the sophistication of the signalling that can be done via an analog line or trunk.

In the most limited case, the announcement equipment appears as a conventional telephone to the switch. Thus, when the switch is directed to connect a customer to an announcement, it "calls" the announcement equipment. The announcement equipment, in response to the incoming call from the switch, answers the call and plays the announcement. When attached to a trunk, the switch can signal the announcement equipment to start playing a message by using trunk signalling techniques, e.g., winking or flashing, or seizing, the trunk to notify the equipment when to start playing the announcement.

In the most sophisticated case, the equipment still appears like a conventional telephone but, when the equipment answers the call, it accepts multi-frequency (MF) signalling from the switch to control the announcement. In most cases, however, each separate announcement requires a separate piece of announcement equipment and a separate line, or trunk, to the switch. More advanced announcement equipment has been designed to store more than one announcement, but they still associate one storage area with each announcement, e.g., equipment with four announcements requires four separate areas on a recording medium. Therefore, the announcement playback scenarios are limited in complexity to whatever capabilities the switch has for connecting a single fixed announcement to a call.

Another problem with existing systems is the fact that, even when multiple messages are possible, each message must be recorded in a prescribed manner. Some systems allow only a fixed number of messages, with each message using no more than a certain memory storage capacity. Other systems allow a variable number of messages but, because of the fixed nature of the memory storage arrangement, a changed message must be no longer than the message it replaced. In these systems, a change in one message usually requires a change in the other messages. Also, since the message must be stored in a fixed format, there is no opportunity to compress the message and thus gain greater memory capacity for other messages. In addition, using the systems currently available, it is not feasible to play the same announcement concurrently to different stations, particularly when the start times for each such station are different.

SUMMARY OF THE INVENTION

These and other problems have been solved with an announcement circuit that is integrated with the communication system via a control channel and, in one embodiment, resides in a system port slot thereby providing direct access to the internal buses of the communication system.

In one time division environment, these buses are the time division multiplexing bus (TDM) and the control channel bus. In such an environment, the announcement circuit has four major components, namely (1) network interface: circuitry to mate the announcement circuit to the TDM and control channel buses; (2) announcement control processor: processor complex to control and interpret the exchange of system messages for the recording and playback of announcement messages; (3) encoder/decoder: circuitry to provide sixteen independent conversion resources; and (4) announcement memory: circuitry used to store digitized speech samples.

To record a message, the central system call processing instructs the announcement circuit, called ANN, as to the time slot the incoming speech will be on using a control channel. One arrangement for such movement of control information between the central processor and the announcement circuit is the subject of our concurrently filed, co-pending patent application Ser. No. 901,011, filed Aug. 27, 1986, which applications have a common assignee and which application is hereby incorporated by reference herein.

Through the network interface circuit, ANN picks up the 64 Kb/s digital pulse code modulated (PCM) samples from the TDM bus. ANN feeds these samples through the encoder/decoder which can, under control of call processing, take the speech samples and pass them straight through to the announcement memory or compress them, for example, to 32, 24, 16 or 8 Kb/s samples. The samples coming out of the encoder/decoder are then stored in the announcement memory. Compressing the samples simply means they will take fewer memory bits to store.

To play back an announcement, system call processing tells ANN which announcement and which time slot(s) to play the announcement message back on. ANN retrieves the stored samples from its speech memory, runs them through the encoder/decoder which, if necessary, expands them back to their original PCM sample size and then places the PCM samples on the appropriate TDM bus time slots through the network interface circuit.

One advantage of this system is that the user retains the option of selecting the compression rate on a per-announcement basis. Since increasing the speech compression rate also degrades the speech quality, this effectively allows the user the ability to trade off between speech quality and announcement storage space. For example, if the user decides that announcements to be played to incoming customers should be of the highest quality, those announcements would be stored using minimal speech compression. However, the use could decide that announcements, which are to be played to internal parties who are familiar with the announcement, may be stored with maximum compression to conserve announcement storage space.

Another advantage is that by separating the network interface and speech encoder/decoder from the announcement memory, a more flexible announcement circuit is possible. For example, since each of the encoder/decoder channels is controlled independently, any stored announcement can be played by any channel. Therefore, many different messages can be played simultaneously or, the same message can be played through many channels with the start time of each of the channels controlled independently. This gives the system the option of playing the same message to multiple users either by conferencing multiple users to the same time slot or by assigning a separate encoder/decoder channel and TDM bus time slot to each user.

The ANN circuitry makes use of an announcement memory allocation scheme that allows a user to record any number of announcements, each of any length, provided that the total announcement storage time does not exceed the fixed memory size. Furthermore, when a user chooses to re-record an announcement, the new announcement length is not limited to the length of the announcement it replaces; the new announcement can occupy as much space as remains in the announcement memory. From the user's perspective, each announcement is an independent entity that can be recorded and re-recorded with little concern for interfering with existing stored announcements. Under this arrangement, messages can be re-recorded and further compressed as additional message space is required.

BRIEF DESCRIPTION OF THE DRAWINGS

These and other objects and features, together with the operation and utilization of the present invention, will be more apparent from the illustrative embodiment shown in conjunction with the drawings in which

FIGS. 4 and 5 are timing charts;

FIG. 10 shows the organization of data for the announcement memory.

DETAILED DESCRIPTION

Figure 3:
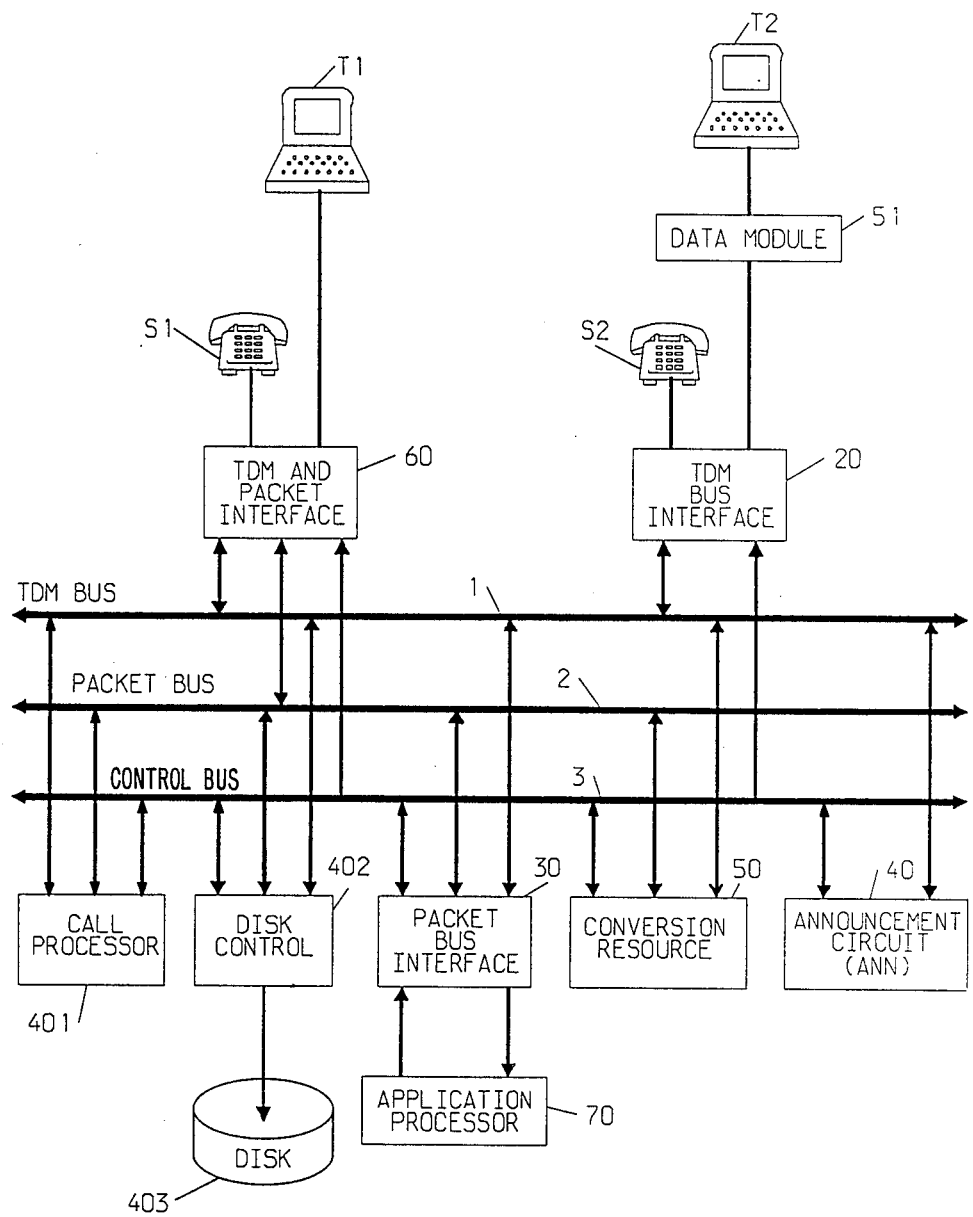
FIG. 3 is a block diagram of a system in which our invention can be used.

FIG. 3 shows a block diagram of one embodiment of our invention where announcement circuit (ANN) 40 is shown connected to TDM bus 1 and clock bus 3. The communication system bus structure shown in FIG. 3 is similar to the communication system bus structure described in U.S. Pat. No. 4,535,448, dated Aug. 13, 1985, which patent is hereby incorporated by reference herein. ANN 40, which advantageously can be mounted on a plug-in board and inserted into a particular slot on a printed wiring housing (not shown), contains many, for example sixteen, separate announcement resources.

Each resource can either pick up PCM samples from the TDM bus (i.e., record an announcement) at a predefined compression rate or retrieve stored speech samples from the resource circuit's memory array and expand them into 64 Kb/s PCM samples. In the embodiment, ANN 40 can record one announcement at a time but can play back up to sixteen simultaneously. However, any number of concurrent announcements could be recorded on different channels.

Figure 2:
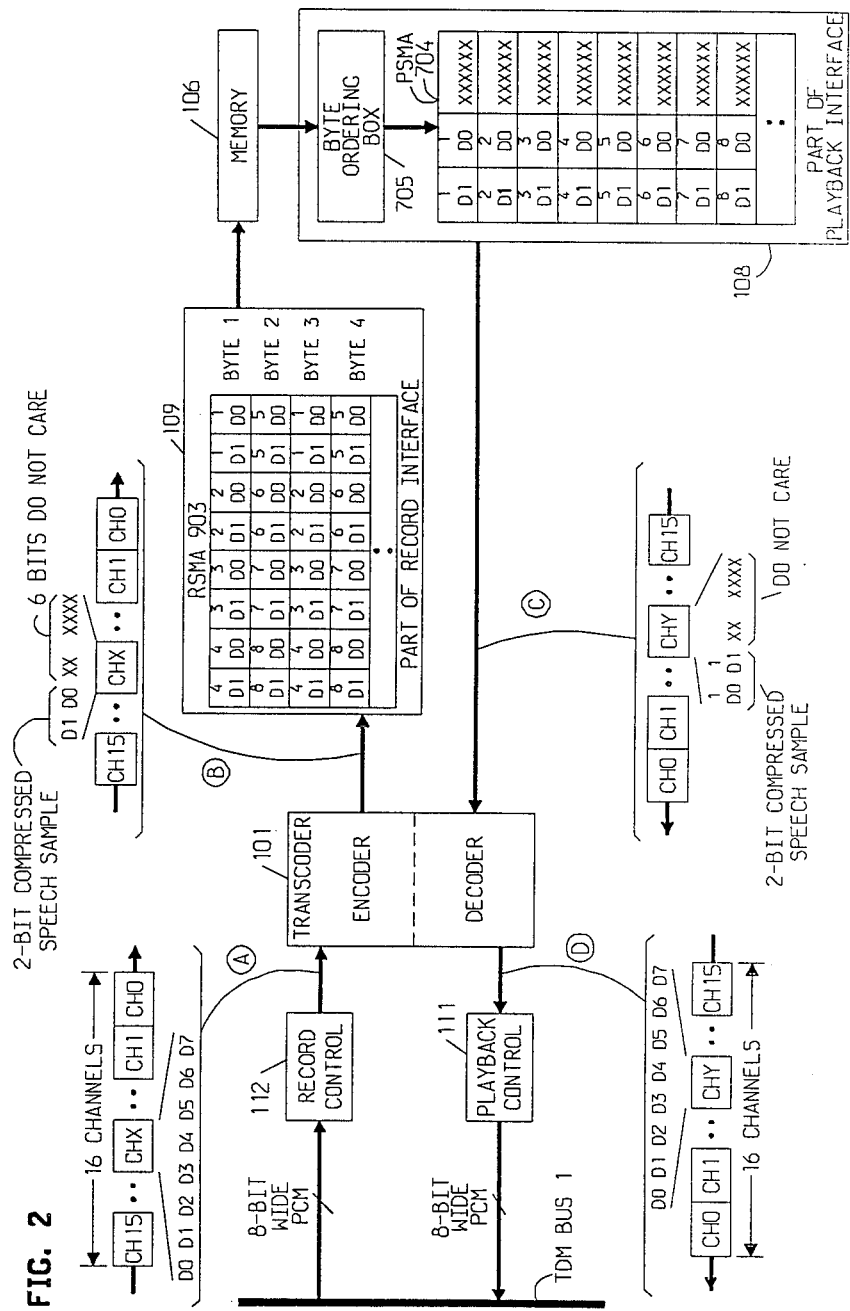
FIG. 2 shows in block diagram form the operation of the announcement circuit.

FIG. 2 is a visual picture of what happens to a speech sample from the time it is retrieved from TDM bus 1 (record) to the time when it is placed back on TDM bus 1 (playback).

Scenario
1. 16 Kb/s record/playback sessions.
2. Recording channel is CHX.
3. Playback channel is CHY.

RECORD

Hardware Set Up
1. Network record interface in record control 112 is activated for recording an announcement.
2. The system is configured for 16 Kb/s record session on CHX.

Starting from the top left of FIG. 2, the 8-bit (D0–D7) PCM sample from TDM bus 1 is picked up by record control 112 which multiplexes it onto channel CHX in the serial input stream into the encoder 101. This is shown in blow-up A.

Encoder 101 compresses the 8-bit sample into a 2-bit sample and outputs the sample (D0–D1) and discards the other six bits of sample on its serial output line in the CHX time slot. This is shown in blow-up B.

To make efficient use of the speech memory, the 2-bit samples are then concatenated with four other samples of two bits each into 8-bit words by record interface 109. Buffer memory RSMA 903 is shown with byte 1 having samples 1, 2, 3 and 4, each with bits D0 and D1. The bytes are then moved to memory 106 for storage. This will give storage at 16 Kb/s which is a 4:1 compression rate. If this concatenation were not done, there would be no saving of memory space with compressed message samples.

To playback the compressed message, the 8-bit word bytes, each containing four compressed PCM samples, are read out of memory 106 into playback interface 108. Byte ordering box 705 separates each of the 2-bit compressed speech samples (D0 and D1) of each byte into four consecutive locations of buffer called the PSMA buffer. Each 2-bit sample has added to it six "do not care" bits for transmission purposes since decoder 101 expects to see 8-bit words in each of sixteen time slots. The decoder is designed to know that it is expanding 2-bit samples (with six "extra" bits), as shown in blow-up C, into 8-bit samples. Therefore, while PSMA 704 passes 8-bit samples on the CHY time slot, decoder 101 only looks at the first two bits in the CHY time slot to create a PCM 8-bit word which is a reconstructed data sample, as shown in blow-up D.

Playback control 111 picks up the serial output of decoder 101 and transfers it to the appropriate time slot on TDM bus 1.

Transcoder 101 expects on its serial input line from memory 106 sixteen channels of speech every frame cycle (i.e., 125 $\mu$secs). This is shown in FIG. 4. Each channel (CH0–CH15) contains two, four or eight bits of digital information, depending on the chosen compression rate.

FIG. 5 shows one channel (channel CH0) broken into sixteen arbitrary units by the 2 MHz clock signal. For 64 Kb/s, eight time units are used to provide a message sample of eight bits. As discussed above, this gives no compression. For 32 Kb/s, four bits are transferred to or from the buffer and, for 16 Kb/s, two bits are transferred.

Figure 1:
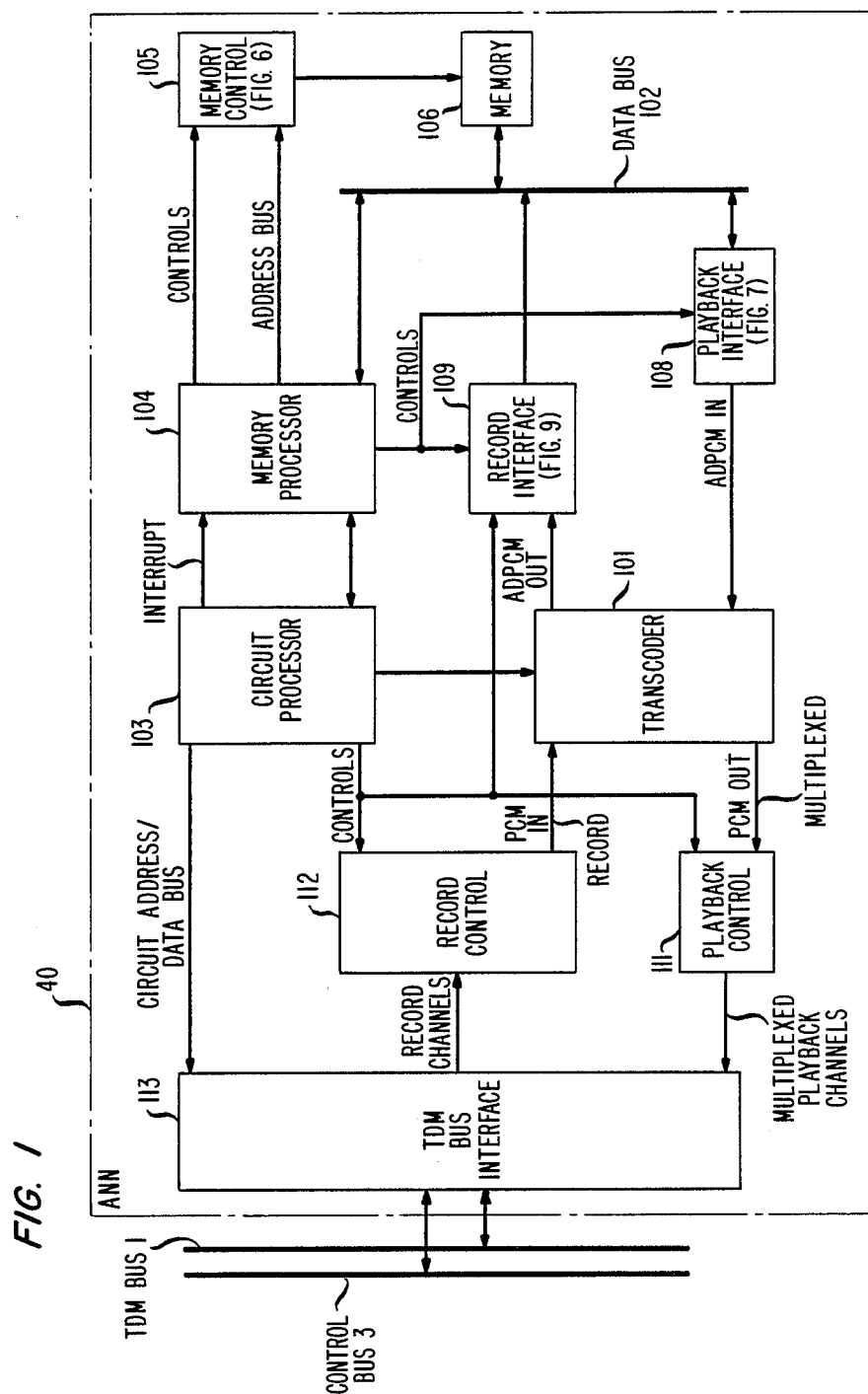
FIG. 1 shows details of our announcement circuit.

FIG. 1 shows a more detailed block diagram of the announcement circuit. A brief description of each block follows.

Transcoder 101 accepts PCM/ADPCM samples and compresses (or expands) the samples using Adaptive Differential Pulse Code Modulation (ADPCM) to provide sixteen independent channels multiplexed onto serial input/output lines. Transcoder 101 supports compression (or expansion) rates of 64 Kb/s (no compression, pass-through mode), 32 Kb/s (2:1 compression mode) and 16 Kb/s (4:1 compression mode). The input PCM code words can be either A or MU-LAW format, as specified by the user. Transcoder 101 defaults to MU-LAW, unless otherwise instructed.

Circuit processor 103 provides the necessary per-channel controls, such as compression rate and record/playback mode. Included in this circuit is a dual port RAM (DPR). This array is accessed asynchronously by circuit processor 103 on one input and read synchronously by transcoder 101 and by record control 112.

Circuit processor 103 also includes a microprocessor, such as an Intel 8031, 16 pl K of program ROM and 8 K of RAM. The processor manages board operation by being the control channel message interface to call processing, running maintenance tests and overseeing the operation of memory processor 104.

In this particular implementation, memory 106, which stores the messages, contains 1 megabyte of dynamic RAM. The memory array, as will be seen, requires eighteen lines for row/column addressing and two lines for bank selection. Access and refreshing of the memory array is accomplished via memory control 105. An Intel 8031 processor is used in memory processor 104 for controlling the recording and playing of messages to and from the memory. Only announcement messages are stored in the dynamic announcement memory 106, and all control code structures and pointers used for control purposes (e.g., link lists) are stored in static memory within circuit processor 103, memory processor 104 or memory control 105.

The size of memory 106 bounds the total amount of message data (and, thus, announcement length) that can be stored. This space is flexibly dividable among any number of different announcement messages whose lengths may vary. As discussed, the storage space for each message is a function of the compression rates chosen for the various recorded message announcements. For the embodiment shown, the maximum message times are 2 minutes 8 seconds (all messages stored at 64 Kb/s), 4 minutes 16 seconds (all messages stored at 32 Kb/s) and 8 minutes 32 seconds (all messages stored at 16 Kb/s). Of course, larger memories could be used to give other storage times.

As discussed, the announcement system allows flexible message lengths and the announcements will be stored such that any single announcement can be of any length up to the maximum memory space available. Individual announcements are re-recordable or replaceable without any restriction on the length of the replacement message other than that it must be able to fit in the unused space in memory 106.

Figure 6:
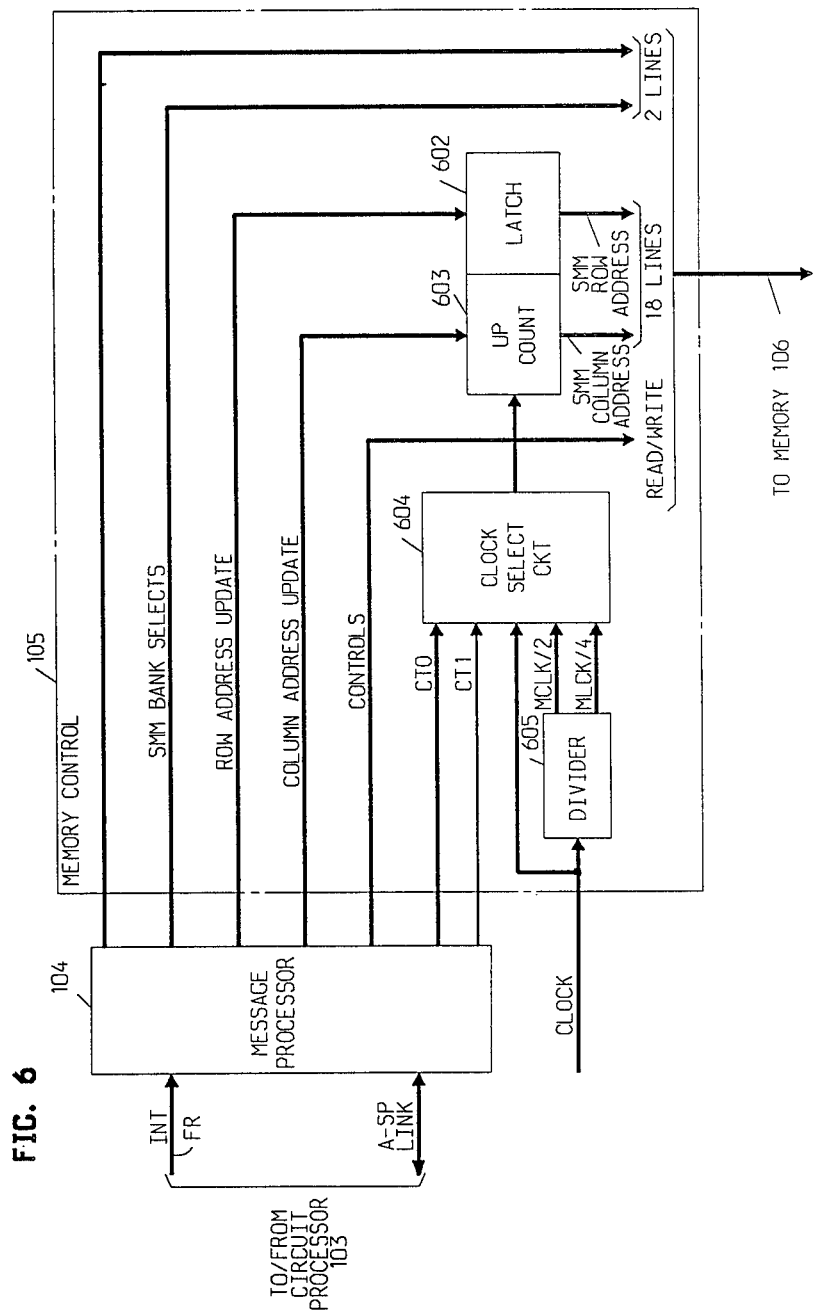
FIGS. 6 and 7 show details of various circuits of the announcement circuit.
Figure 7:
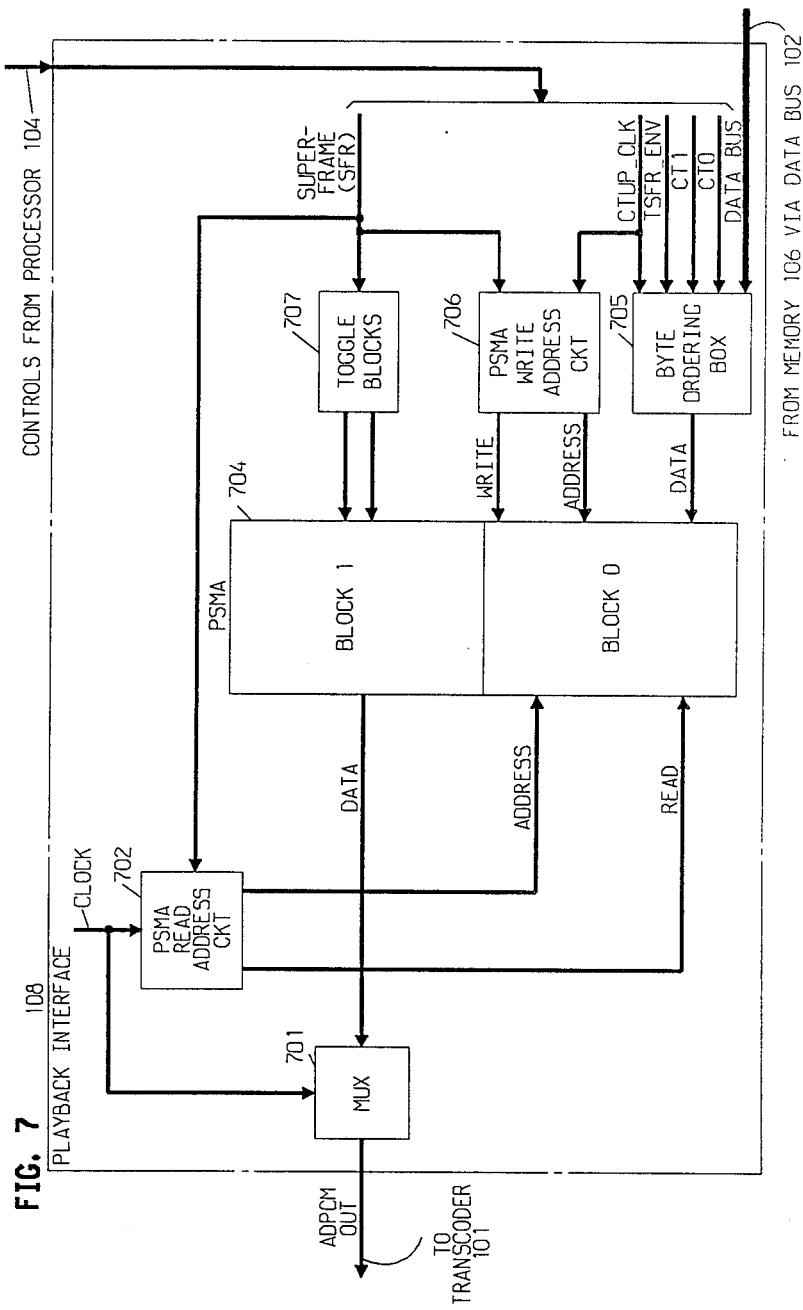

FIG. 6 shows the structure of memory control 105 which solves the real time constraint of retrieving one speech sample every 7.8 $\mu$secs from memory 106. To alleviate processing time burden on memory processor 104 when interacting with memory 106, recording or playback of a message is accomplished via block transfers between the memory and playback interface 108, as shown in FIG. 7.

In the block transfer mode, memory processor 104's major task is to provide to memory control 105 for each record or playback session the starting address of the block to be transferred in or out of the memory. During each block transfer, sixteen speech samples must be retrieved. However, since the speech samples may be compressed, the number of bytes transferred during a single block transfer will vary depending on the compression rate. For example, if the 8-bit message samples were compressed to 4-bit samples, then only eight bytes would need to be transformed to yield sixteen 4-bit samples. This is controlled by memory processor 104 via memory control 105.

Since memory 106 is an 8-bit/byte word array, the recorded message samples are stored in the memory one word (byte) at a time regardless of the compression rate. However, as discussed above, each byte may have one, two or four data samples depending upon the compression rate. Therefore, it is necessary, when reading data out of the memory, to transform the 8-bit output words into the original sample sizes of 2-, 4-, or 8-bits/speech sample. This conversion is performed by playback interface 108 (FIG. 7) where byte ordering box 705 performs this task with the format shown in FIG. 10. Thus, as shown for each block transfer, the number of bytes out of byte ordering box 705 is always sixteen even though the number of input bytes varies.

Since the system expects sixteen channels of data per frame and the message processor provides sixteen bytes of data per frame for each specific channel, a buffering mechanism is used to collect the byte ordering box output speech samples and multiplex them via multiplexer (MF) 701 (FIG. 7) to the input of transcoder 101. This task is performed by buffer memory PSMA 704. This memory array consists of a 512×8 dual port RAM. The PSMA is partitioned into two blocks, each block 256 bytes deep with each block containing sixteen 16-byte buffers.

Figure 8:
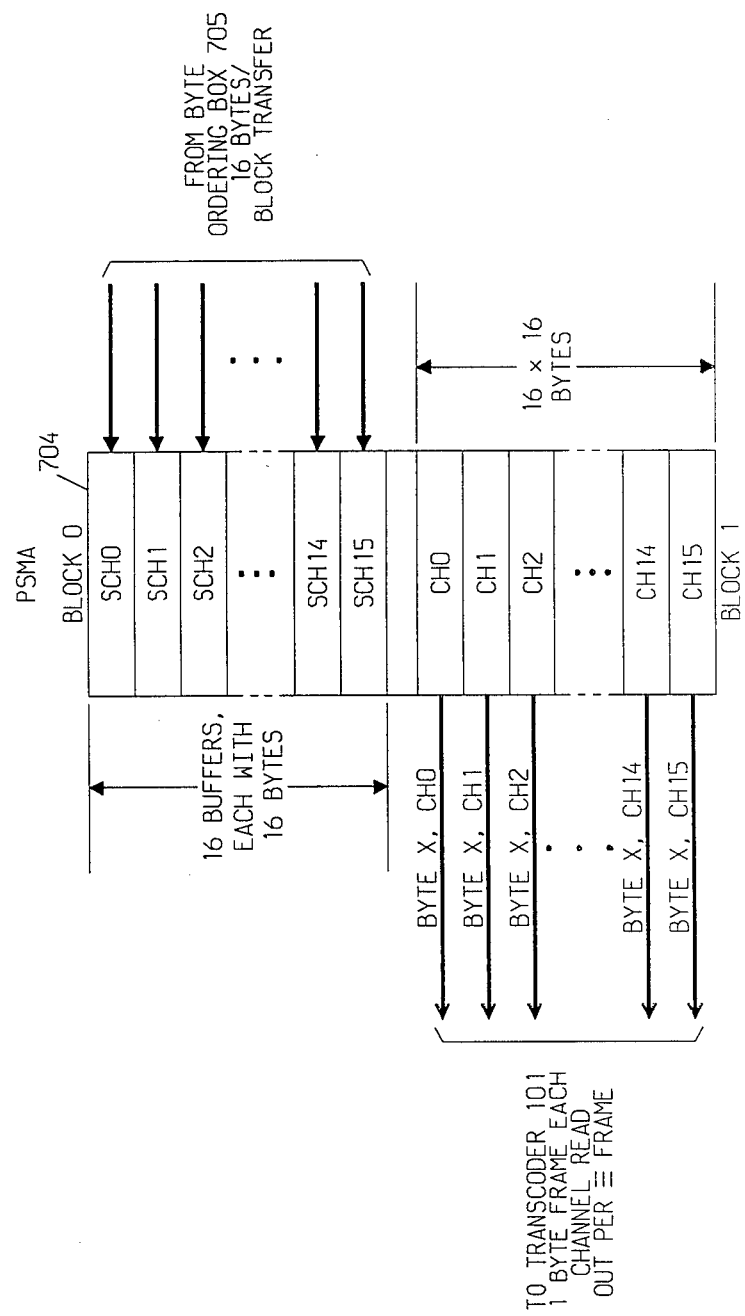
FIG. 8 shows a memory arrangement.

The PSMA interface is designed such that when one block is written the other block is read simultaneously. This is possible since the time required to write one block equals the time to read the other block (i.e., 16 frames=2 msecs=256 bytes). Upon completion of processing a block (i.e., write or read), the block positions are interchanged. The previously written block is now read and the previously read block is now written by the byte ordering box with new speech samples. The operation of PSMA 704 is shown in more detail in our co-pending, concurrently filed patent application Ser. No. 901,004, filed Aug. 27, 1986, which applications have a common assignee and which application is hereby incorporated by reference herein. FIG. 8 shows the alternate arrangement of data in the PSMA buffer blocks.

Figure 9:
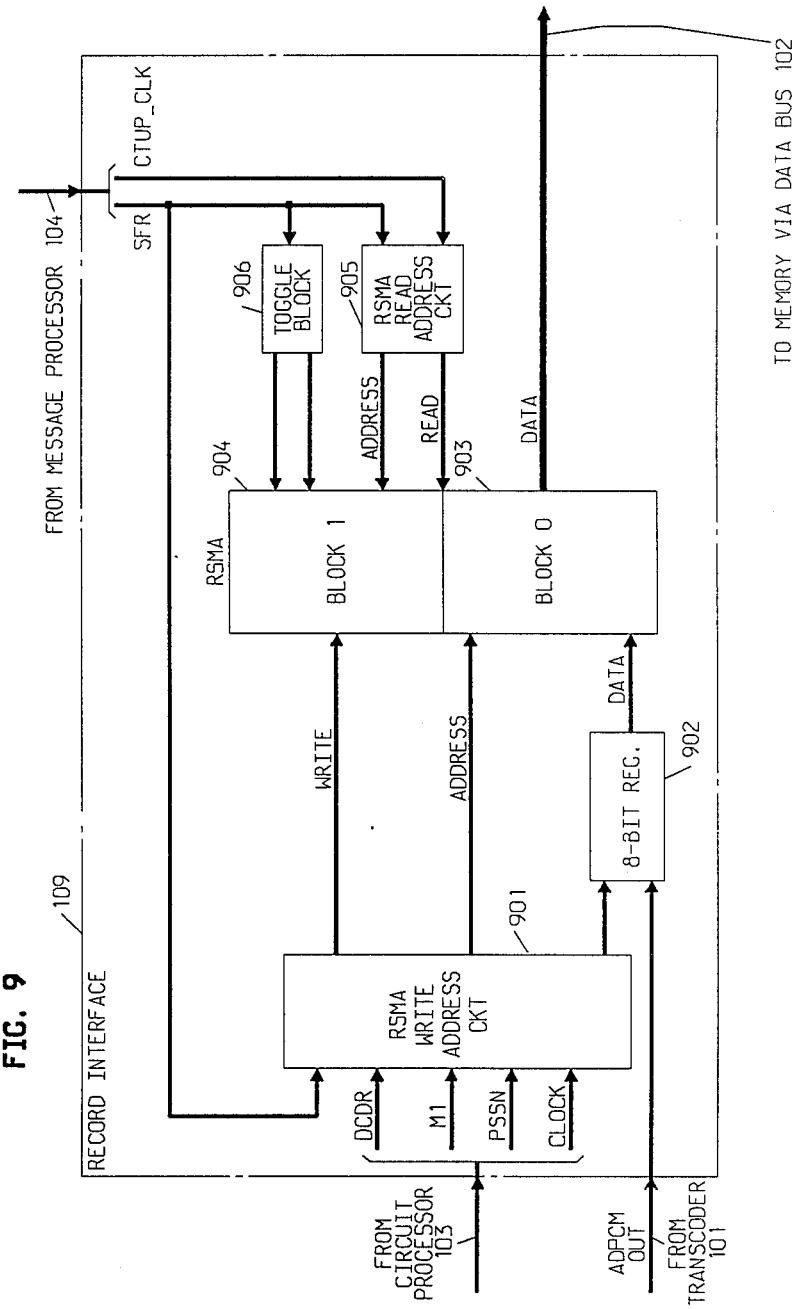
FIG. 9 shows details of the record circuit of the announcement circuit.

For recording messages, record interface 109, FIG. 9, works in the opposite direction from playback interface 108 and demultiplexes the ADPCM samples from transcoder 101 serial output and transfers the demultiplexed signals to memory 106. Record interface 109 directs the channel output ADPCM out samples into dual-ported two block buffer RSMA 903. Since memory 106 is an 8-bit wide memory array, RSMA 903 acts as a buffer to collect the samples and form full 8-bit words for all compression rates.

Announcement circuit 40 (FIG. 1) allows only one recording session at the time and, thus, the recording channel will be processed every 2 msecs (i.e., every sixteen frames) by message processor 104. During that 2 msec period, the number of data bytes stored in RSMA 903 varies, as discussed above, as a function of the compression rate.

From the message processor point of view, the block transfer protocol for recording is the same as for playback and, thus, the only difference is that the processor is now writing to the memory instead of reading from the memory.

Returning to FIG. 1, TDM bus interface 113 consists of four network processing elements (NPE's) which provide sixteen access points to the TDM bus for the sixteen channels. The NPE's can be constructed in the manner set forth in U.S. Pat. No. 4,389,720, dated June 21, 1983, which patent is hereby incorporated by reference herein. Circuit processor 103 can be constructed in the same manner as the microprocessor controller shown in the aforesaid patent.

Playback control 111 multiplexes the sixteen channels from transcoder 101 into sixteen serial NPE channels. The NPE's then convert each of their serial inputs into 8-bit parallel outputs.

The system can be expanded, as necessary, to hold more data by changing the compression rate of already stored data. In this regard, the system would remove the announcement data from memory onto the system bus over one channel. At the same time, the system records the removed announcement data over another channel at a higher compression rate.

The first version of the announcement is then discarded and the original storage space reused. Thus, the system can adapt, as needed, to the demand for storage by compressing data only when there is a shortage of memory capacity.

Conclusion

While our invention has been shown in conjunction with an announcement system, it could be used by one skilled in the art for any number of data storage systems. For example, the stored messages could be delivered to a single user at a later time or to a limited number of users. Used in this manner, the system would provide message store and forward services. Also, the system could be used as an answering device with the storage of one or more messages by a user.

Other types of arrangements are also possible, particularly where data compression or data conversion is possible, in order to conserve storage space. Such a system could be, for example, a video storage system where images, perhaps pages of a video catalog, are stored in a compressed format and made available over any number of channels to users.

Also note that data can come into the system in any form, analog or digital, and can be converted by a front-end processor (either in the NPE or otherwise) into a form suitable for compression and/or storage. While the embodiment discusses one such message input line, the system is operable to receive messages for storage over any number of lines simultaneously.

What is claimed is:

1. An announcement system for use in conjunction with a communication system, said announcement system comprising
a memory,
means for storing announcement messages in said memory, each announcement message having a data size and an associated memory storage requirement, said storing means determining said memory storage requirement by using any one of a number of compression factors on each announcement message, and
means responsive to a predetermined condition for removing any stored announcement message, revising the determined memory storage requirement of that removed announcement message by using another one of said number of compression factors and storing that removed announcement message having a revised memory storage requirement in said memory.

2. The announcement system set forth in claim 1 wherein said storing means includes means for replacing any stored announcement message at a specific area within said memory with another announcement message, a predetermined portion of said another announcement message occupying said specific area and the data sizes and compression factors of said any announcement message and said another announcement message being independent of one another.

3. The announcement system set forth in claim 1 further including
means for removing stored announcement messages, said removing means expanding predetermined ones of said removed announcement messages to their original prestorage data sizes, and
means for transmitting any removed announcement message over a plurality of communication channels.

4. The announcement system set forth in claim 1 further including
means for removing stored announcement messages, said removing means also expanding predetermined ones of said removed announcement messages to their original prestorage data sizes, and
means for transmitting any removed announcement message over a plurality of communication channels at different times on each communication channel.

5. The announcement system set forth in claim 1 wherein said communication system contains an internal control bus for distributing control messages from a system central processor and wherein said announcement system includes means for connecting directly to said control bus.

6. The announcement system set forth in claim 5 wherein said storing means is controlled by said system central processor via signals on said internal control bus.

7. The announcement system set forth in claim 1 wherein each announcement message comprises at least one sample and said storing means includes
means for reducing each announcement message sample having n bits, where n is an integer, into a compressed sample having less than n bits, and
a buffer memory for storing bytes of data, each byte containing a number of compressed samples.

8. An announcement system for use in conjunction with a communication system, said announcement system comprising
a memory, and
means for storing announcements in said memory, each announcement requiring an associated amount of memory storage, said storing means determining said associated amount of memory storage by using a first data compression factor on each announcement, and said storing means, in response to a predetermined condition, using a second data compression factor and any stored announcement to vary the previously determined amount of memory storage associated with that stored announcement.

9. The announcement system set forth in claim 8 wherein said storing means independently controls the first data compression factor.

10. The announcement system set forth in claim 8 further comprising means for removing any stored announcement and for transmitting any removed announcement over a plurality of communication channels.

11. The announcement system set forth in claim 8 wherein said communication system contains an internal control bus for distributing control messages from a system central processor and wherein said announcement system includes means for connecting directly to said control bus.

12. The announcement system set forth in claim 9 wherein each announcement comprises at least one sample and said storing means includes
   means for reducing each announcement message sample having n bits, where n is any integer, into a compressed sample having less than n bits, and
   a buffer memory for storing bytes of data, each byte containing a number of compressed samples.

13. A circuit for storing data blocks representative of messages for delivery to various users, said circuit comprising
   a memory, and
   means for storing data blocks in said memory, each data block requiring an associated amount of memory storage, said storing means determining said associated amount of memory storage by applying a data compression factor to each data block, and said storing means, in response to a predetermined condition, using another data compression factor with any stored data block to vary the previously determined amount of memory storage associated with that stored data block.

14. The circuit set forth in claim 13 wherein said storing means includes means for replacing any stored data block with another data block, said any data block and said another data block each having an independent size.

15. The circuit set forth in claim 14 further comprising means for removing stored data blocks and for transmitting removed data blocks over at least one communication channel, each transmitted data block being transmittable at independent starting times.

16. The circuit set forth in claim 13 wherein said circuit is used in a communication system, and wherein said communication system contains an internal control bus for distributing control messages from a system central processor and wherein said circuit includes means for connecting directly to said control bus.

17. The circuit set forth in claim 13 wherein said storing means is controlled by a central processor via signals on a control bus.

18. The announcement system of claim 8 wherein said storage means includes
   means for replacing a first stored announcement at a specific area within said memory with a replacement announcement, said first stored announcement and said replacement announcement each having a size which is independent of one another.

19. The announcement circuit of claim 1 wherein said number of compression factors includes one compression factor which produces no compression of any announcement message.

20. The announcement circuit of claim 8 wherein said first compression factor used by said storing means provides no compression of any announcement message.

* * * * *